United States Patent Office 3,521,593
Patented July 21, 1970

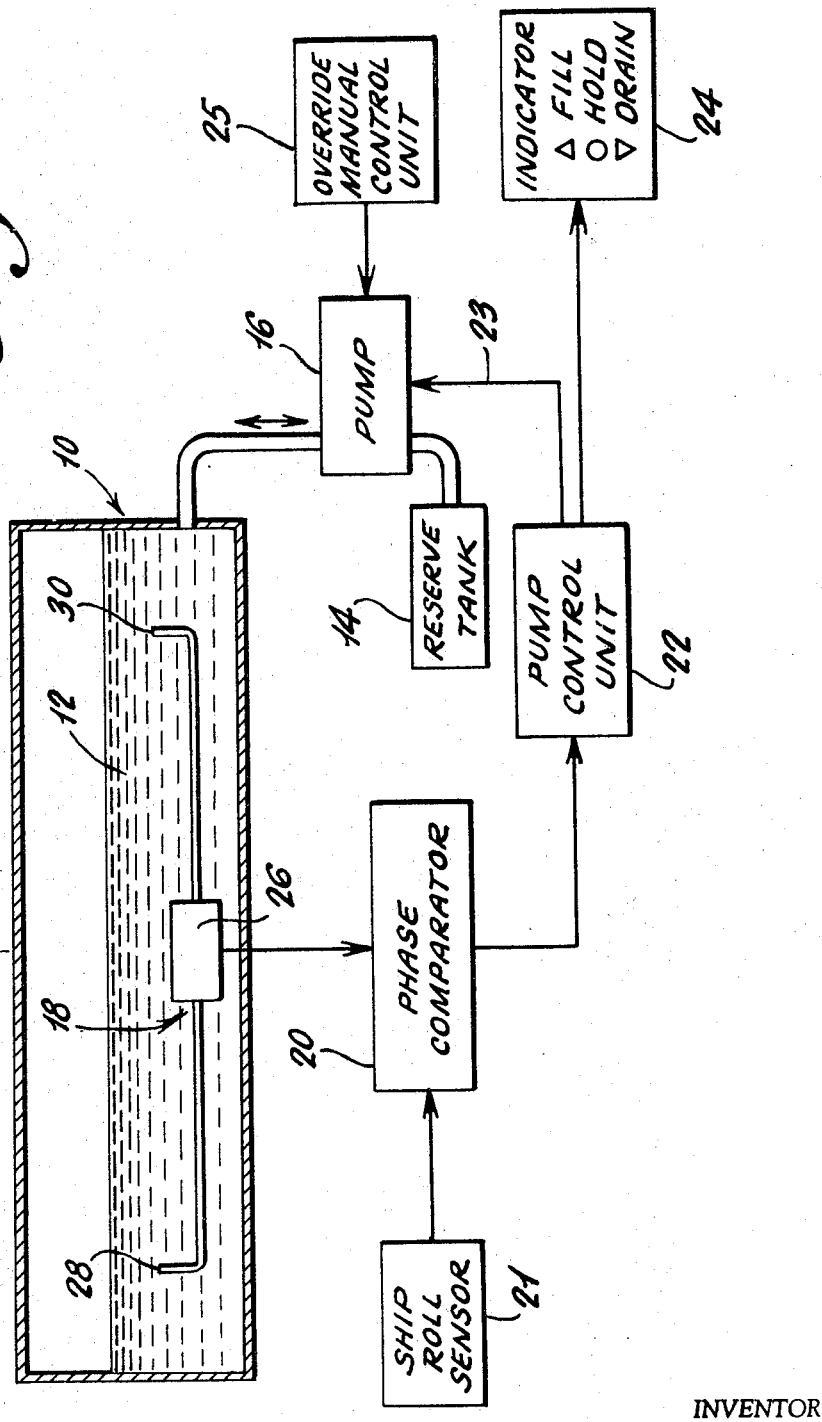

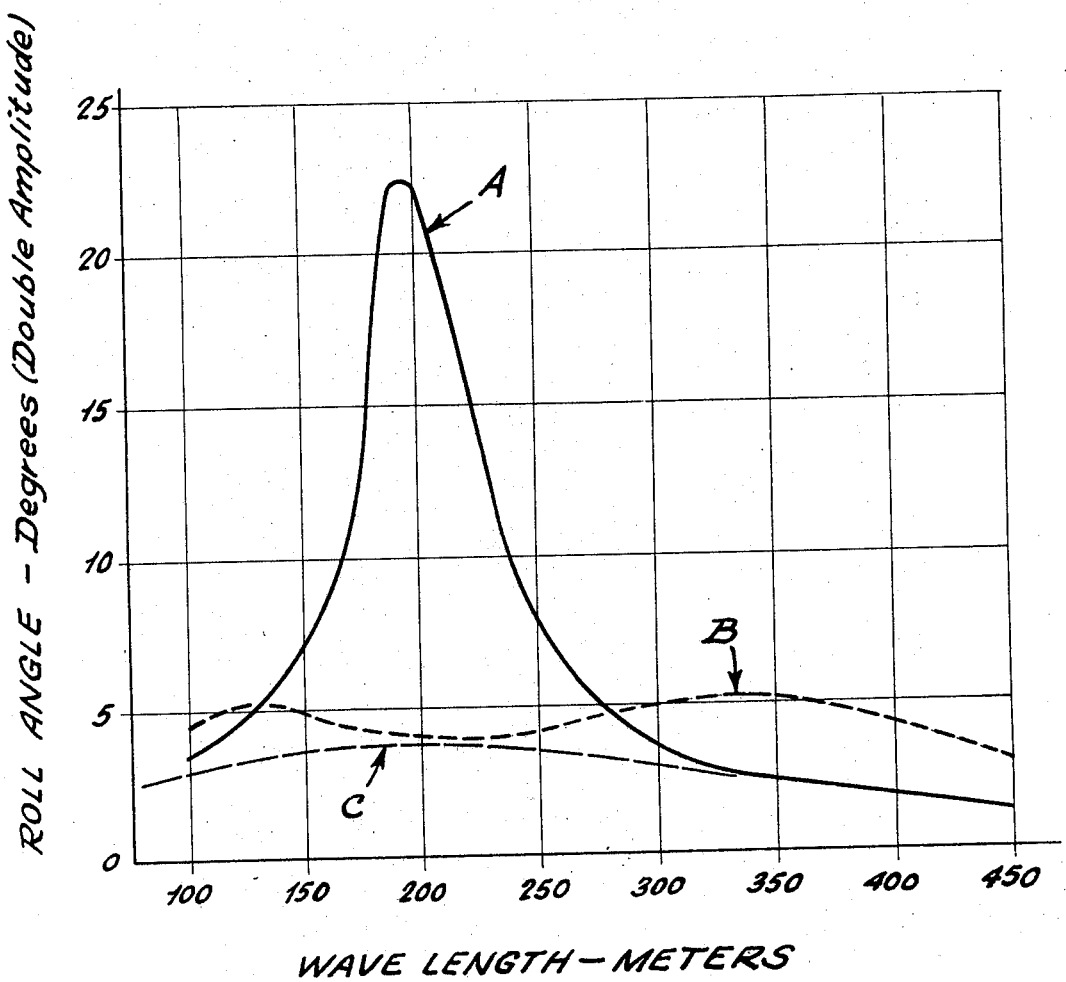

3,521,593
PHASE CONTROLLED ROLL STABILIZATION SYSTEM FOR SHIPS
Frans V. A. Pangalila, Matawan Township, N.J., assignor to Flume Stabilization Systems, Inc., Hoboken, N.J., a corporation of New Jersey
Filed Apr. 19, 1968, Ser. No. 722,642
Int. Cl. B63b 43/06
U.S. Cl. 114—125                                                     8 Claims

ABSTRACT OF THE DISCLOSURE

A phase controlled roll stabilization system for ships comprising an elongated tank extending athwartship and containing a body of liquid in a free surface condition. A pump is provided to raise and lower the liquid level within the tank in accordance with control signals received from a phase comparison unit, the inputs of which represent the tank oscillation and ship roll. The system is designed to automatically and continuously adjust the liquid level so as to maintain the tank liquid oscillation near the optimum 90° phase lag relative to the ship's roll.

---

The present invention relates to an automatically tuned free surface type passive tank ship stabilizer, embodying sensing and control devices to establish optimum frequency tuning within said tank by comparing the tank-ship phase relation so as to insure maximum stabilizer performance at all times.

In the past it has been difficult to maintain during operation the proper phase relationship between moment force produced by fluid flow in a free surface passive tank stabilizer and the rolling motion of the ship. Consequently, whenever such phasing falls outside prescribed limits, the tank operates with less than maximum efficiency. Up to now approximate methods have been utilized to correct this condition whereby manual reading of the ship's roll period has been decided upon as a means of assessing basic stability conditions, and in accordance therewith, manual adjustment has been made to the liquid level in the hope of optimizing tank operation. Therefore, for these tanks virtually operating with a fixed liquid level, an operator is required to continuously take roll period readings and to continuously readjust the tank liquid after making a mental determination of whether to add or subtract liquid and by how much.

It is a primary purpose of the present invention to insure that the phase relationship in a free surface type passive tank stabilizer will be such that the stabilizer will operate with maximum efficiency at all times without the problems outlined above. The invention approaches the ideal system in that it automatically senses the rolling characteristic of the vessel as it exists in a uniquely passing sea, senses tank liquid flow, and adjusts the phase relationship between ship and tank liquid oscillation by automatically raising and lowering the liquid level until the phase relationship is such that maximum stabilizer performance is achieved.

In rare cases when a ship is rolling with a frequency significantly outside of its natural rolling frequency— which is a function of the ship loading condition—a free surface tank with a fixed liquid level could cause a slight destabilization. With the present invention automatically changing the liquid level, destabilization cannot occur.

It is therefore a primary object of the invention to provide a passive stabilization system that avoids the problems and achieves the advantages outlined above.

Other objects will become apparent with the following detailed description in view of the appended drawings in which:

FIG. 1 is a diagrammatic and schematic diagram of the system including the invention.

FIG. 2 illustrates frequency response curves for ships under various stabilizing conditions.

As general background, it is noted that there is a significant operational superiority to be found in the free surface type passive tank stabilizer such as that disclosed in the U.S. patent to Ripley, No. 3,054,373, as contrasted with the U-tube or submerged duct type anti-roll system, commonly termed the Frahm system. This superiority in part results from the ability of the free surface type passive tank to have its frequency of operation tuned by raising or lowering liquid level so that it operates over a wide range of vessel stability conditions. This benefit is striking when compared, for example, with the inflexibility of the U-tube type system, whose fixed frequency characteristics led to substantial destabilization of the vessel when the energy input of the sea came at frequencies which differed from the designed frequency of the U-tube stabilizer system. Thus, in the free surface type passive tank stabilizer, the liquid level is manually selected and held at lower to higher levels to increase the frequency of liquid oscillation within the tank in order to correspond with the rolling period of the ship. As is generally known, ship roll frequency increases as the metacentric height increases. While the frequency of the free surface passive tank system can be established generally by design considerations, primarily the configuration and fluid mass or depth, the effectiveness of the oscillations thus induced as an anti-roll stabilizer depends almost entirely upon establishing a phase lag and tuning relationship between the moment forces within the tank and the rolling of the ship which contains the tank.

Specifically, the free surface moment vector—a function of tank frequency and roll angle of the partially filled tank—is induced to lag the roll of the ship by (ideally) 90° due to the configuration of the tank or introduction of damping devices, or both, thus inhibiting the roll of the vessel and at the same time counter-acting the tendency to roll past the normal of the wave slope on which the vessel is riding.

Heretofore, the tank liquid level has been set primarily to tune the tank with the natural roll period of the ship. A system according to this invention adjust the tank liquid level for resonance at *any* rolling frequency. This is accomplished by continuously sensing the phase lag between the tank liquid movement and ship roll; automatically energizing corrective steps when an adequate phase relationship does not exist; and automatically stopping corrective action when phase lag for maximum stabilizer performance is again established.

Referring now to FIG. 1, the system according to the invention includes a free surface passive stabilization tank generally indicated as 10 arranged within the vessel (not shown) with its long dimension extending athwartship. According to standard practice, tank 10 is partially filled with a body of liquid 12 to a level commensurate with the tank geometry and internal hydraulic damping so that the tank liquid oscillation is tuned to the rolling frequency of the ship and has an ideal phase lag of 90° thereto. For a more complete disclosure of a suitable tank design and its operation, reference is made to the aforementioned U.S. Pat. No. 3,054,373. However, it will be understood that tank 10 can have any suitable design so long as it operates with a free surface liquid body. The liquid body 12 can consist of any suitable liquid such as fuel oil, bunker oil, liquid cargoes of various types, or special solid suspension fluids such as drilling mud and the like.

Operating fluids such as these may be supplied from a ship board reserve tank 14 of suitable capacity which can be suitably divided by a number of bulkheads to prevent tank 14 from reducing GM or adding an unwanted moment to the ship. A reversible pump 16 is provided to supply or withdraw the operating liquids to and from tank 10 at any suitable location. In the event sea water is to be used as the stabilizing medium, pump 16 communicates with the sea (not shown).

A transducing apparatus 18 is arranged within tank 10 to sense the tank liquid oscillation and to develop an electric signal which alternates in a corresponding manner as the tank liquid oscillation. Preferably, the output of transducer 18 represents electrically a measurement of moment imparted to the ship. This output of the transducer 18, which represents tank liquid oscillation is applied to an electrical phase comparator unit generally indicated as 20 receives a signal from roll sensor 21 which senses the rolling oscillation of the ship and develops an electric signal accordingly. Comparator unit 20 generates signals representing the phase displacement between these signals and applies its output to the pump control unit 22 which in turn develops command signals at its output 23 whenever the phase displacement falls outside prescribed limits. The command signals are fed to pump 16 to energize the same in the forward or reverse direction depending upon the particular command. Pump 16 remains energized and continues to change the level of liquid body 12 until the phase relationship of the output signal of transducer 18 is again within the designed range relative to the rolling of the ship. For most efficient operation, the hold, fill and drain action characteristic is in hysteresis form as further described below. Outputs are also fed to an indicator device 24 to inform a monitor as to when and in what direction to change the liquid level in tank 10 in the event manual operation of pump 16 is desired.

In one example, the transducer apparatus 18 includes a differential pressure sensing device 26 fed by port and starboard pressure tubes having input orifices 28 and 30 located below the surface of body 12 and within opposite wing regions of tank 10. The sensing device may be either a direct or indirect reading apparatus, as long as it succeeds in instantaneously measuring physically either the difference in liquid levels, forces or weights of liquid at the sensing locations. A pressure sensitive transducer is preferred, although a surface measurement level device such as a float, or a variable resistance electrical bridge, or a capacitance device may be suitable. A transducer type measurement below the surface is preferred since there are a wide variety of waves, of varying profiles and height, which may exist on the surface of the tank, depending on tank configuration. Single or multiple locations of sensing device inputs may be used with locations selected equidistant to the port and to the starboard of the centerline of the tank, so that maximum and minimum phase measurements can be developed which is, of course, compatible with the control unit.

As mentioned above, the electrical output of device 26 is applied to the phase comparator unit 20 which is a standard piece of electrical equipment and generally known in the art in great variety. For example, unit 20 can be a phase discriminator that produces a D.C. signal in accordance with the phase displacement of the input signals.

Roll sensor 21 is a conventional gyroscopic unit or suitable equivalent.

Pump control unit 22 can comprise a conventional signal sensing apparatus receiving the varying D.C. signal from circuit unit 20 and controlling pump 16 accordingly. If the received signal is within a selected range, unit 22 develops an indicating signal at output 23 which renders an indication at 24 that the tank liquid level is at an acceptable setting. In the event the D.C. signal from unit 20 falls below or above the range set in unit 22 a corresponding command signal will appear on output 23 to control pump 16 accordingly so as to operate pump 16 in the forward or reverse direction, accordingly, and render the proper signal for indicator 24. If desired, the system may include a unidirectional pump and appropriate reversing values controlled by the output unit 23. Unit 22 continues to operate pump 16 until the output of unit 20 again falls well within the prescribed range to cause unit 22 to deactivate the respective output 23 and apply a hold signal to indicator 24.

Reliability of the system is improved and hunting is avoided by designing the system to operate in the nature of an automatic feed-back servo system whereby the pumping will be stopped at the time that the liquid level in the stabilizer tank is such that the 90° or optimum phase relationship exists and the sensing criteria for cessation of pumping will operate over a significantly smaller range of phase lag accuracy than the range which must be exceeded in the non-pumping stage so that the circuit automatically energizes corrective action. For example, during operation a hold signal appears on line 23 as long as the tank oscillation lags the ship's roll within the range of 70 to 110°. At or below 70°, unit 22 operates pump 16 to begin draining operation which condition continues until the roll angle reaches 85° lag at which unit 22 output returns to the hold condition and draining stops. Similarly, the fill operation does not begin until the tank oscillation lags the ship by 110° or greater after which filling continues until the lag angle magnitude has been reduced to say 90° where the unit 22 output returns to the hold condition. In this way, filling or draining commences only when the programmed limit of 70 or 110° lag angle is exceeded; and once begun, filling or draining continues until the lag angle is adjusted well into the acceptable operating range of 85 to 90° lag.

It is preferred that the circuitry be adjusted in its servo feedback nature so that the diagnostic indication of maladjustment would operate only if the phase lag occurred beyond the pre-set limit for a certain number of cycles. For example, if the circuitry was pre-set to accept the operating range of 80° to 90° phase lag as acceptable for operation, unit 22 takes corrective action on the basis of a typical 10 cycle time average.

Obviously, variation of the automatic control exists whereby the indicator lights show that the water level is either too low or too high for the proper phase relationship, and manual action could be taken by manipulating override unit 25. Also, the invention can be used to automatically control or indicate the correct level when the tank is initially filled for operation.

With reference to FIG. 2, there is represented a frequency response curve A for the case of an unstabilized ship, curve B for the case of the same ship operating with a free surface passive tank stabilizer having a fixed liquid level medium adjusted for resonance at the natural roll frequency of the ship and curve C for the case of the same ship and stabilizer as curve B but utilizing the present invention. It can be seen in the case of curve B, the system imparts some destabilization at the extremities of the frequency range. This destabilization results from a substantial shift in the tank liquid oscillation from the ideal 90° phase lag relative to the rolling of the ship. However, with the present invention, since the tank-ship frequencies are maintained near the 90° phase deviation as described above, destabilization is avoided and maximum stabilization efficiency is achieved throughout the frequency range.

It will be appreciated that various modifications can be made to the herein disclosed example of the present invention without departing from the spirit and scope thereof.

What is claimed is:

1. A roll stabilization system for ships comprising an elongated tank extending athwartship generally the full beam thereof, a body of liquid partially filling said tank, said tank having a height to maintain said liquid in a free surface condition generally throughout the tank, adjustment means to fill and drain the tank so as to raise and lower the liquid level within the tank, and means for sensing the tank liquid oscillation and ship rolling to selectively control said adjustment means to maintain the tank liquid phase lag within a predetermined range.

2. The system of claim 1 wherein said last mentioned means includes a transducing apparatus to sense the liquid oscillation within the tank and generate an electric signal corresponding to said oscillation, and a ship roll senser generating a signal corresponding to the ship's roll and a phase comparator unit receiving the aforementioned signals and generating an output corresponding to the relative phase displacement of the input signals, and a control unit coupled to receive the output of said phase comparator unit and further coupled to activate the adjustment means whenever the output of the phase comparator unit exceeds predetermined limits.

3. The system as set forth in claim 2 wherein the control unit deactivates the adjustment means when the output of the phase comparator returns to within a predetermined range inclusive of said predetermined units.

4. The system as set forth in claim 1 wherein said adjustment means includes a pump having a manual override control capability.

5. The system of claim 1 wherein said adjustment means includes a reserve tank on board the ship and a pump operated by said last mentioned means to transfer liquid between said tank and said reserve tank.

6. The system as set forth in claim 2 wherein said transducing apparatus includes at least one pressure sensing device located near the wing portion of said tank below the liquid level thereof and a transducer sensing the pressure variations of said pressure sensitive device and generating corresponding electric signals.

7. The system as set forth in claim 3 wherein the predetermined range includes 90° phase lag.

8. In a ship fitted with a free surface tank roll stabilizer, the method of passively stabilizing the ship, the method comprising the steps of: comparing the tank liquid oscillation and the roll of the ship; and constantly adjusting the gross amount of liquid in the tank, thus the tank liquid level, so that the tank liquid phase lag is within a predetermined range near 90° lag.

References Cited
UNITED STATES PATENTS 3,192,888  7/1965  Field _____ 114—125

FOREIGN PATENTS 1,470,048  1/1967  France.

TRYGVE M. BLIX, Primary Examiner